United States Patent [19]
Deckert et al.

[11] Patent Number: 6,023,919
[45] Date of Patent: Feb. 15, 2000

[54] SADDLE FOR MARINE ANIMALS

[76] Inventors: Frank L. Deckert, 11 Windmere Ct.;
Forrest I. Townsend, Jr., 806 Wagon Wheel Rd., both of Ft. Walton Beach, Fla. 32547

[21] Appl. No.: 09/045,474

[22] Filed: Mar. 20, 1998

Related U.S. Application Data

[60] Provisional application No. 60/042,442, Mar. 28, 1997.

[51] Int. Cl.[7] .............................. B68C 1/02; B68C 1/20; B68C 5/00; A01K 29/00
[52] U.S. Cl. ............................................. 54/37.1; 119/856
[58] Field of Search ............................ 54/37.1; 119/850, 119/856, 858, 859, 905; 224/905; 248/683

[56] References Cited

U.S. PATENT DOCUMENTS

| | | | |
|---|---|---|---|
| 199,067 | 1/1878 | Hoff | 224/199 |
| 803,505 | 10/1905 | Pullman | 54/37.1 |
| 2,876,980 | 3/1959 | Salter | 248/683 |
| 3,990,401 | 11/1976 | Langguth | 119/29 |
| 4,258,869 | 3/1981 | Hilgendorff | 224/32 |
| 5,644,902 | 7/1997 | Kemp | 54/37.1 |
| 5,887,772 | 3/1999 | Dooley | 224/191 |

*Primary Examiner*—Michael J. Carone
*Assistant Examiner*—Son T. Nguyen

[57] ABSTRACT

A device for holding a payload to a marine animal having a body with a fin and having a body surface where the device is to be attached having a shape comprising a pack having an inner surface and outer surface, the inner surface having a shape corresponding to the body surface and a holding means for holding the pack to the body surface and wherein the device has a front and a back and further comprises a front opening a rear opening allowing the water to move between the pack inner surface and body surface and wherein pack further comprises a body portion fitting over the body and a fin pack fitting around the fin and wherein body portion and fin pack are joined by a hinge means.

22 Claims, 3 Drawing Sheets

SADDLE FOR MARINE ANIMALS

PRIORITY STATEMENT

The inventors claim priority based on Provisional Application: 60/042,442 Filed: Mar. 28, 1997.

PRIOR ART:

Saddles are well known for land animals. The present invention is related to packs or saddles used for holding gear to marine animals.

GENERAL DESCRIPTION OF THE PREFERRED EMBODIMENTS

The present invention is a platform to be attached to marine animals. In the preferred embodiment, the invention comprises a pack fitting over a fin having several features which make it functional which can house equipment. These features include the following:

1) Features to time release the device;
2) Features to retrieve the device;
3) Features to improve the comfort of the device including flexibility, ventilation of water flow and elasticity of the connection to take into account pressure gradients;
4) Features to hold various types of equipment in a usable fashion.

BRIEF DESCRIPTION OF THE DRAWINGS

FIG. 2 shows a cross section of strap 11 showing the use of a chafe guard.

DETAILED DESCRIPTION OF THE PREFERRED EMBODIMENT

Figure 1:
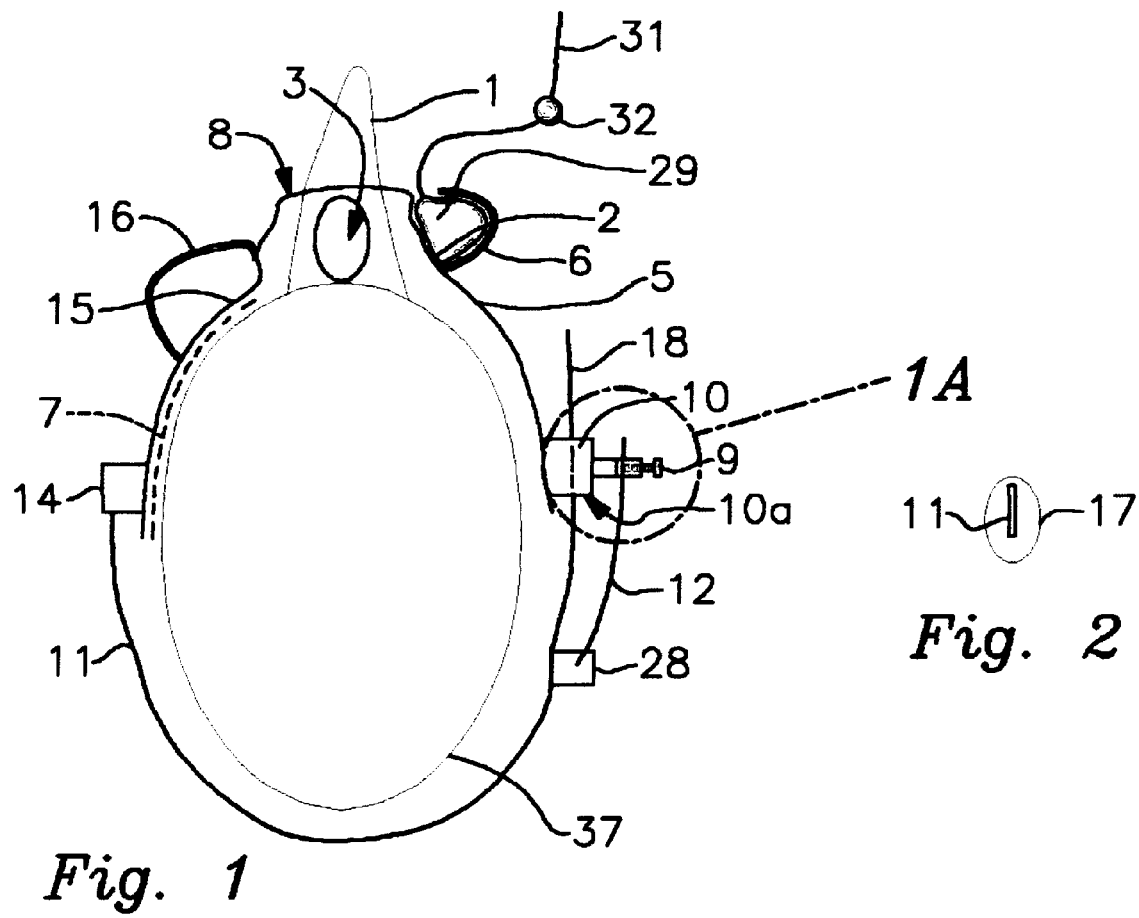
FIG. 1 shows a cross sectional view of the preferred embodiment.
Figure 1A:
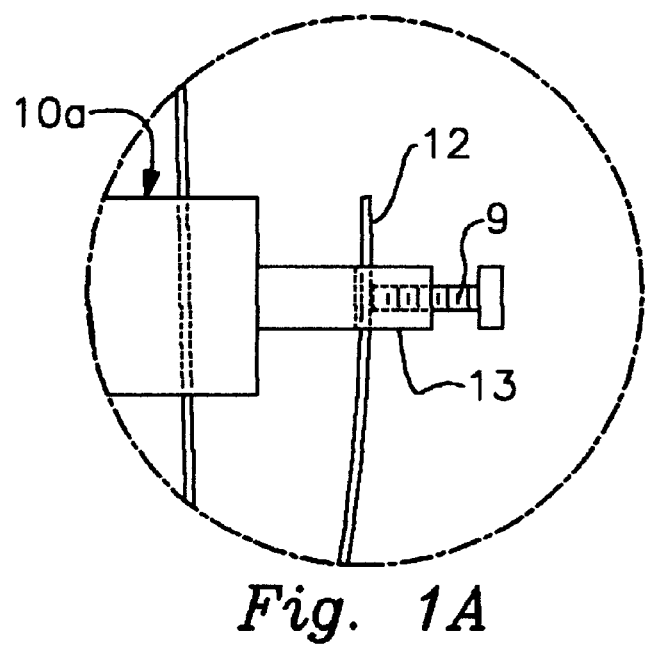
FIG. 1a shows a detail of FIG. 1.

As can best be seen by reference to the cross-section shown in FIG. 1, the invention comprises the dorsal fin extension (stabilizer) 2 which fits over the dorsal fin 1 of the animal. This is preferably made of semi-flexible material or construction in order to allow movement of the dorsal fin and to allow movement at the point where the fin intersects with the body proper of the animal to which it is attached. The dorsal fin extension (stabilizer) 2 defines at least one front opening 3 which allows water to pass over the dorsal fin and has a top opening 8 which allows a portion of the fin to be exposed and allows the device to fit over the fin.

While a single opening 3 is shown in the preferred embodiment, it is obvious that the number of openings 3 may be varied in accordance with the function of allowing water to pass over the covered area of the dorsal fin.

The saddle further comprises at least one securing strap 11 with at least one time release buckle means. This buckle means in the preferred embodiment comprises a permanent connection 14 attached to one end of the securing strap 11. The securing strap 11 is held in the middle by a elastic attachment 28 on one end and by bolt 9 and T-nut nut attachment 13. The excess strap 18 of the strap 11 fits through a buckle 10 which is attached to the body of the saddle, here at the left saddle flap 5. The excess strap 18 can move freely within the buckle 10. The strap 11 is held with tension from an elastic strap 12 traveling from the buckle 10 where it is attached with a degrading pin 9 to the T-nut attachment 13. The elastic strap 12 allows the securing strap 11 to move out and inward to adjust for breathing and compression due to pressure gradients.

The saddle is hinged by a series of side openings 4 along the left and right side of the dorsal fin extension 2. Below these holes or side openings 4 on the left (side of the animal) is a left saddle flap 5 and on the right is a right saddle flap 15. The left side of the dorsal fin extension 2 is shown here with a transmitter pocket 6 which contains a transmitter 29 having an antenna 31 held up by a float 32 and the right side of the dorsal fin extension is shown with a camera housing 16 respectively. Forward is a front equipment pocket 25 holding a camera 26 which points in the same direction as the animal. It is obvious that the location of the various pockets may be varied in accordance with the need of the saddle.

These equipment housings may be replaced with or supplemented with flap equipment housings 34. These housings may have leads 36 passing through flap openings 35 to monitor or send signals to the animal.

The permanent connection 14 is provided to securely hold a plastic or other type strap 11 on one side of saddle, while opposite side may incorporate the time release mechanism. In the preferred embodiment, as shown in FIG. 2, the strap 11 is encased within a polyethylene chafe guard 17 which may totally encase the strap 11 or may only encase a portion of the strap 11. The strap 11 fits around the body or girth 37 of the animal to which the saddle is attached.

On the buckle 10 there is a strap channel or central opening 10a through which the strap 11 may freely pass in either direction.

Excess strap 18 extends preferably at least six inches outside of the buckle 10 to allow for dynamic changes (movement of the strap 11 through the opening 10a) during respiration or as the pressure variations change the size of girth 37 of the animal.

A degradable pin 9 or other release means is mounted on the saddle flap 5 at or about the location of the buckle 10. Attached to the degradeable pin 9 is a flat elastic strap 12 which dynamically pulls the strap 11 through the buckle 10 by way of the attachment to the t-nut attachment means 13 which is mounted on the strap 11 opposite the excess strap 18 from the buckle 10.

The pin 9 functions as a timed release means and is degradeable so that the device will fail within a predetermined time range and the flat elastic band 12 will be disconnected from the buckle or strap 11 releasing the strap 11 which may then slide completely out of the buckle 10, releasing the saddle pack from the animal.

In order to recover the saddle pack, a buoyant material forms a part of either embodiment sufficient to float it to the surface. The dorsal fin extension may be further equipped with a transmitter signaling its location.

Figure 3:
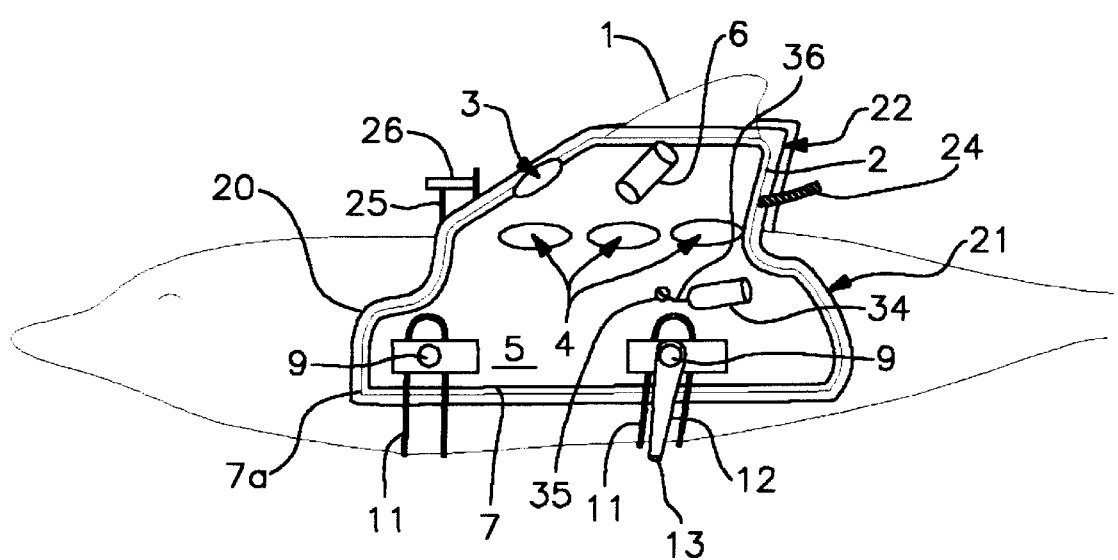
FIG. 3 shows a plan view of one embodiment of the invention shown in FIG. 1.

An aliplast lining 7 is in place between the animal and the inner surface of both saddle flaps 5 and 15 and any hard portion of the dorsal fin extension 2. This aliplast lining 7 is a closed cell foam. An open cell foam perimeter shown as a in FIG. 3 extends along the perimeter of the closed cell foam lining 7. This material of open cell foam 7a is designed to reduce friction when exposed to water or movement to prevent chafing.

Equipment housings 6 and 16 may vary in shape and size in order to hold the equipment desired and there may be mountings on the front 20 or rear 19 of the dorsal fin extension and/or saddle flap described herein.

Two embodiments are shown. The second embodiment shown in FIG. 4 uses water moving over the surface of the device to hold the model in place, assisted by a suction cup layer which attached directly onto the dorsal fin.

Figure 4:
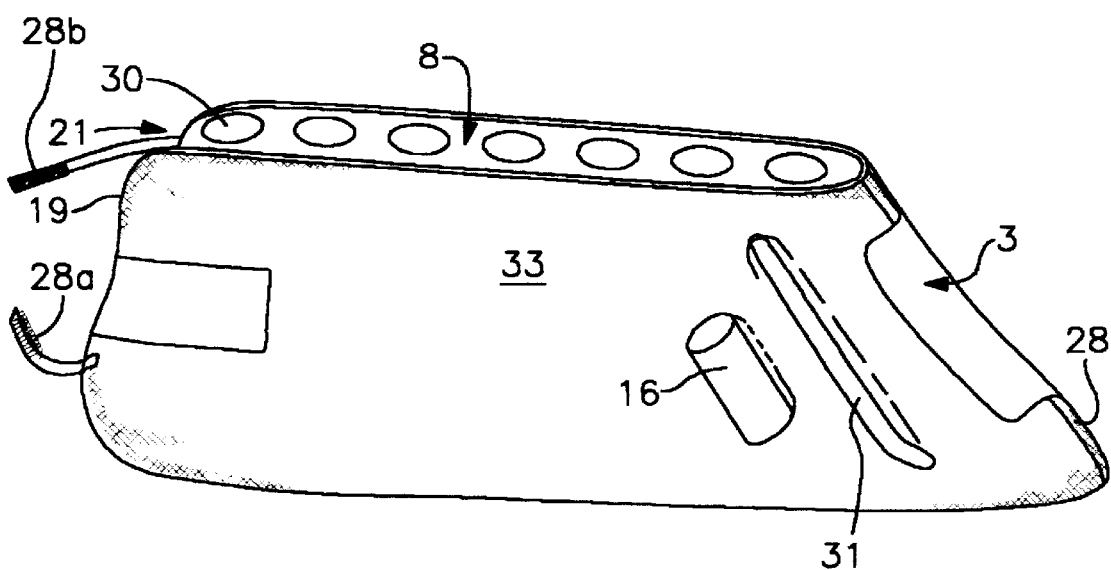
FIG. 4 shows an alternate embodiment of the invention.

The second embodiment is generally described as a saddle with at least one ventilation port, here a front opening 3 at the leading edge of dorsal fin. This pack is absent the flaps and the series of smaller ports, side holes 4, parallel to base of dorsal fin to allow increased flexibility (movement) and allow the passage of water. As can be seen in FIG. 4. there is a rear strap 24 which is preferably a cooperating hook and loop type fastener. There may be a degradeable magnesium strip 28 of this strap 24 or at the front of the pack 33, here shown as a strip 28 of degrading material in order to allow for the eventual release of the strap 24. The strap 24 may be flexible and elastic in order to more securely hold the saddle in place. Similarly, the same type of elastic description described in FIG. 1 may be present. While this strap is preferably secured by a cooperating hook and loop means, it may also comprise spring steel stays or the like.

The outer layer of the saddle pack is a semi-ridged body sculpted mold having an aliplast liner with straps and buckles with or without degradable device for predetermined time release.

On the outer edges of the aliplast lining 7 is a layer of plastizote 7a. The aliplast is a closed-cell foam which does not absorb water while the plastizoate is an open-cell foam or similar material which softens under friction and/or absorbs water in order to stay soft in order to reduce chafing around the edges.

In order to increase the flexibility of the body sculpted mold a series of side openings 4 are located along the place where the dorsal fin extension (stabilizer) joins the saddle flaps at the base of the dorsal fin.

In the preferred embodiment, the MPE layer (Modified Polyethylene) makes up the outer surface of the saddle pack. The MPE layer is usually 1/8 to 5/32 of an inch in thickness and the aliplast is approximately 3/16 of an inch, giving the total depth of the dorsal fin extension and platform to be approximately 11/32 of an inch.

The strap 11 is encased in a tubular plastic polyethylene chafe guard 17 as shown in FIG. 2 and it will not have an aliplast bottom in the preferred embodiment. In the preferred embodiment, a layer of Vaseline or other lubricant is also used below the entire saddle to minimize chafing.

In the embodiment shown in FIG. 4, the rear 19 of the dorsal fin extension 2 is open by a slit 21 and may be held together by a Velcro strap 24. The dorsal fin extension may support equipment pockets 25.

The embodiment of the invention shown in FIG. 4 comprises a similarly body sculpting mold defining an opening for the fin. It is a dorsal fin pack which only encloses the bottom portion of the dorsal fin.

In this embodiment, the straps 11 are eliminated and replaced with a suction cup interface. In order to enhance the adhesion (compression) of the suction cups 30 preferably at least 3 to 4 rows. A wing 22 is in place which is at an angle parallel to the leading edge of dorsal fin so that the water pushing off of the wing 22 pushes of the saddle pack 33 against the fin. In either embodiment, an interlocking hook and loop mechanism such as a Velcro strap at the back may be used in order to close and open the back end 19 of the dorsal fin saddle pack shown in FIG. 4.

The equipment housings in either embodiment may be molded into the plastic or may be attachable to the plastic with a variety of attached housings.

It is possible to use strips of magnesium or other degradeable materials, or, alternatively, to use magnesium bolts for the release mechanism. The composition of the magnesium rods may differ in order to enhance the correctly timed degradation of the link. The use of other degrading materials (any material which degrades in salt water or fresh water at an acceptable rate would be appropriate for use) is envisioned.

In order to produce these saddles, in the preferred embodiment, a cast is made of the body and dorsal fin with plaster bandage in parallel layers to facilitate custom fit.

There may be a rigid anterior edge and a tab on the posterior edge. The leading edge may be split with a magnesium link, connecting the two halves together until the magnesium or other link corrodes just as a band of material joins the two ends of the velcro strap. In addition, if the entire leading edge is split a spring may be mounted between either side a and b and the springs may be of a dissimilar metal so that when the material degrades, the spring is released and the front of the platform breaks away.

An adhesive is used to hold the suction cup mats to the interior of the saddle pack shown in FIG. 2. It is possible to thermally bind the interface to permanently attach the suction cup mats to the modified polyethylene. These suction cup mats have a series of suction cups 30 facing the skin of the animal it is attached to and are altogether similar to those present on bath tub mats.

The saddle packs may be equipped with a similar releasing mechanism in order to systematically release the load. For example, the individual payloads may be attached with degrading materials. The pay load may be equipped with a lighter than water buoyancy compensator in order to bring them to the surface. Similarly, the saddle pack may be released according to depth, temperature or other parameters. In some embodiments, a pin may be put in place through one side of the dorsal fin extension, through the fin 1 itself and then attached on the other side.

With the embodiment shown in FIG. 4 utilizing suction cups the dorsal fin pack will fit over the dorsal fin and will be parallel to leading edge of dorsal fin with an opening of approximately two inches in the front. It may approximately 3½ inches tall from top to bottom and have a wing as described above for deflecting water with fins sloped approximately the same angle as the leading edge to push the suction cups against the fin's surface.

When molding, it may be desirable to use a plaster cast in the shape of the animal which the pack is to be attached in order to provide for custom fit. For some age and species types, there may be a generic size.

Weights may be attached separately or may be molded into pack along with floatation to correctly hold a transmitter antenna out of water after pack is jettisoned.

In the preferred embodiment, the pack itself is weighted so that the antenna is held above the water when the pack is released. Either the payload or the fin pack may be released when a preset condition (such as the passage of time with a degrading release means) occurs. Depth, time, receipt of a radio signal, a signal from a device carried in the payload (such as a signal that the film is gone from a camera in the payload area) are examples of events which may trigger a release timer.

A signal device for receiving signals from the animal (for example body signs) or sending signals (such as a signal to tell the animal to return) may also be a part of the payload.

The pack need not go all the way to the trailing edge of the dorsal fin and in some situations, it would be better that it not go all the way to the trailing edge dorsal fin. In all cases, it is usually best that it not totally encase the trailing edge of the dorsal fin since it is desirable that water will pass through the front opening over the dorsal fin and then pass out the posterior edge of the platform pack.

I claim:

1. A device for holding a payload to a marine animal having a body, a body surface, and a girth where the device is to be attached to the animal's body comprising:
   a) a pack having an inner surface and outer surface, said inner surface corresponds to the body surface of the animal;
   b) a holding means for holding the pack to the body surface and wherein the holding means further comprises at least one suction cup having a suction end attachable to the body surface by suction and a retaining end attached to the inner surface.

2. The device of claim 1 wherein the holding means further comprises a plurality of suction cups, each of the suction cups having a suction end attachable to the body surface by suction and a retaining end attached to the inner surface.

3. The device of claim 2 wherein the holding means further comprises a layer of elastic material attached to the retaining end on one side and the pack on the other side having a shape corresponding to and being smaller than the body surface so that when the device is put in place the layer conforms to the shape of the body surface.

4. The device of claim 2 wherein the pack is flexible and further comprises a left side and a right side and a strap from the left side fitting around the body surface of the animal to the right side, said strap further comprising an interlocking hook and loop securing means which may secure the strap around the body surface so as to exert tension on the suction cups.

5. The device of claim 4 wherein the strap is elastic.

6. The device of claim 2 wherein the device further comprises a left side and a right side and a length between the left side and right side and wherein the holding means further comprises:
   a) a first strap means fitting around the girth of the animal from the left side to the right side of the device.

7. The device of claim 6 wherein the first strap means further comprises a girth means for allowing automatic contraction and release of the length of the first strap means when the body is compressed by pressure and to allow the animal to breathe.

8. The device of claim 7 wherein the first strap means further comprises a first strap and a left buckle for receiving the first strap, said left buckle being on the left side of the device and a right buckle for receiving the first strap said right buckle being on the right side of the device and wherein the left buckle allows for the first strap to move through the buckle and wherein the strap means further comprises an elastic strap having a first end and second end, said first end being attached by an elastic strap attachment means to the left buckle and said second end attached by a second elastic strap attachment means to the first strap.

9. The device of claim 8 where at least one of the first and second elastic strap attachment means further comprises a release means for releasing the elastic strap after a predetermined interval or event.

10. The device of claim 2 wherein the device further comprises a release means for releasing the device from the body surface after a predetermined interval or event.

11. The device of claim 10 wherein the holding means further comprises a degrading material which degrades within a predetermined time and releases the holding means after it degrades.

12. The device of claim 11 wherein the degrading material is magnesium.

13. The device of claim 2 wherein the device further comprises a containing means for containing a payload.

14. The device of claim 13 wherein the payload further comprises a signal means for receiving or sending signals to the marine animal.

15. The device of claim 13 wherein the containing means further comprises a payload release means for releasing the payload from the device after a predetermined interval or event.

16. The device of claim 2 wherein the device has a front and a back and further comprises a front opening and a rear opening for allowing water to move between the pack inner surface and body surface.

17. A device for holding a payload to a marine animal having a body, a fin, a body surface, and a girth where the device is to be attached to the animal's body comprising:
   a) a pack having an inner surface and outer surface, said inner surface having a shape corresponding to the body surface of the animal;
   b) a holding means for holding the pack to the body surface and wherein the holding means further comprises at least one suction cup having a suction end attachable to the body surface by suction and a retaining end attached to the inner surface and wherein the holding means further comprises a plurality of suction cups, each suction cup having a suction end attachable to the body surface by suction and a retaining end attached to the inner surface and wherein a front opening is adapted to be positioned in front of the fin and wherein a rear opening is adapted to be positioned at the rear of the fin.

18. A device for holding a payload to a marine animal having a body with a body surface where the device is to be attached to the animal's body comprising:
   a) a pack having an inner surface and an outer surface, and where said inner surface corresponds to the body surface of the animal;
   b) a holding means for holding the pack to the body surface, and wherein the device has a front and a back and further comprises a front opening and a rear opening for allowing water to move between the pack inner surface and body surface and wherein the pack further comprises a body portion for fitting over the body of the animal and a fin pack for fitting around a fin of the animal and wherein the said body portion and fin pack are joined by a hinge means.

19. The device of claim 18 wherein the device is at least partially made up of at least semi-rigid material and wherein the hinge means further comprises perforations in the semi rigid material to allow water passage and increase flexibility.

20. The device of claim 18 wherein the device is at least partially made up of at least semi-rigid material and wherein the hinge means further comprises thin portions in the semi-rigid material to increase flexibility.

21. The device of claim 18 wherein the pack outer surface is made at least partially of rigid material and wherein the inner surface is comprised of softer material of closed cell type construction so as to prevent swelling.

22. The device of claim 21 wherein the pack further comprises a perimeter around the pack inner surface comprised of open cell material which softens under movement or on exposure to water to reduce friction around the edges.

* * * * *